US009691316B2

(12) United States Patent
Pyun et al.

(10) Patent No.: US 9,691,316 B2
(45) Date of Patent: Jun. 27, 2017

(54) DISPLAY DEVICE CAPABLE OF CLOCK SYNCHRONIZATION RECOVERY

(71) Applicant: Samsung Display Co., Ltd., Yongin, Gyeonggi-Do (KR)

(72) Inventors: Kihyun Pyun, Gwangmyeong-si (KR); Tongill Kwak, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 20 days.

(21) Appl. No.: 14/791,065

(22) Filed: Jul. 2, 2015

(65) Prior Publication Data

US 2016/0217768 A1 Jul. 28, 2016

(30) Foreign Application Priority Data

Jan. 23, 2015 (KR) ........................ 10-2015-0011524

(51) Int. Cl.
*G06F 3/038* (2013.01)
*G09G 3/20* (2006.01)

(52) U.S. Cl.
CPC ......... *G09G 3/20* (2013.01); *G09G 2310/027* (2013.01); *G09G 2310/08* (2013.01); *G09G 2370/08* (2013.01)

(58) Field of Classification Search
CPC ............................. G09G 5/18; G09G 2300/04
See application file for complete search history.

(56) References Cited

U.S. PATENT DOCUMENTS

| | | | | |
|---|---|---|---|---|
| 2003/0102928 A1* | 6/2003 | d'Haene | H03D 13/003 | 331/172 |
| 2012/0081349 A1* | 4/2012 | Tomita | G09G 3/20 | 345/211 |
| 2014/0118235 A1* | 5/2014 | Hong | G09G 5/008 | 345/87 |
| 2014/0143552 A1 | 5/2014 | Wachtfogel et al. | | |
| 2015/0187315 A1* | 7/2015 | Park | G09G 3/3685 | 345/99 |
| 2015/0326384 A1* | 11/2015 | Wu | H04L 7/0079 | 375/355 |

FOREIGN PATENT DOCUMENTS

| | | | |
|---|---|---|---|
| JP | 2006-047953 | A | 2/2006 |
| JP | 2007-041437 | A | 2/2007 |
| JP | 2014-130369 | A | 7/2014 |
| KR | 10-2013-0009496 | A | 1/2013 |
| KR | 10-2013-0112611 | A | 10/2013 |

* cited by examiner

*Primary Examiner* — Kwang-Su Yang
(74) *Attorney, Agent, or Firm* — Innovation Counsel LLP

(57) ABSTRACT

Provided is a display device including a timing controller configured to output a clock synchronizing signal for a clock data recovery operation, and a plurality of source driving chips configured to perform the clock data recovery operation in response to the clock synchronizing signal, wherein each of the source driving chips includes a filter unit configured to determine whether the first and second detection signals are activated or deactivated in response to a voltage level of the clock synchronizing signal and to output an operation signal according to a comparative result of the first and second detection signals, and an internal clock generator configured to perform the clock data recovery operation in response to the activation state of the operation signal.

13 Claims, 4 Drawing Sheets

FIG. 6

| Section | SFC | P1 | P2 | D |
|---|---|---|---|---|
| T1 | HIGH→LOW | LOW | LOW | LOW |
| T2 | LOW→HIGH | HIGH | LOW | LOW |

< First Transition Section >

FIG. 7

| Section | SFC | P1 | P2 | D |
|---|---|---|---|---|
| T4 | LOW→HIGH | HIGH | HIGH | HIGH |
| T5 | HIGH→LOW | LOW | HIGH | HIGH |

< Second Transition Section >

DISPLAY DEVICE CAPABLE OF CLOCK SYNCHRONIZATION RECOVERY

CROSS-REFERENCE TO RELATED APPLICATIONS

This U.S. non-provisional patent application claims priority under 35 U.S.C. §119 of Korean Patent Application No. 10-2015-0011524, filed on Jan. 23, 2015, the entire contents of which are hereby incorporated by reference.

BACKGROUND

The present disclosure herein relates to a display device, and more particularly, to a display device according to the interface between a timing controller and a data driving unit.

A display device includes a display panel for displaying images, and a gate driving unit and a data driving unit for driving the display panel. The display panel includes a plurality of gate lines, a plurality of data lines, and a plurality of pixels connected to the gate lines and the data lines. The gate lines receive gate signals from the gate driving unit. The data lines receive data voltages from the data driving unit. The pixels receive the data voltages through the data lines in response to the gate signals received through the gate lines. The pixels display grayscales corresponding to the data voltages, and images are thus displayed.

Furthermore, the display device may include a timing controller for controlling the gate driving unit and the data driving unit. The timing controller may generate a plurality of driving signals for controlling the gate driving unit and the data driving unit, such as in response to external control signals. The timing controller may transfer the data driving signals and a plurality of image signals to the data driving unit, such as through the interface with the data driving unit.

Prior to the interface between the timing controller and the data driving unit, the data driving unit performs a clock data recovery (hereinafter, referred to as CDR) operation. In this case, the timing controller may provide the data driving unit with a clock synchronizing signal to control the performance of the CDR operation by the data driving unit. For example, the data driving unit may perform the CDR operation in response to the clock synchronizing signal in an activated state. The timing controller provides the data driving unit with the driving signals and the image signals after the CDR operation of the data driving unit has been completed.

SUMMARY

The present disclosure provides a display device in which the reliability of a clock synchronizing signal provided to a data driving unit from a timing controller is improved.

Embodiments of the present system and method provide display devices including a timing controller configured to output a clock synchronizing signal for a CDR operation, and a plurality of source driving chips configured to perform the CDR operation in response to the clock synchronizing signal, wherein each of the source driving chips includes a filter unit configured to determine whether first and second detection signals are activated or deactivated in response to a voltage level of the clock synchronizing signal and to output an operation signal according to a comparative result of the first and second detection signals, and an internal clock generator configured to perform the CDR operation in response to the activation state of the operation signal.

In some embodiments, the filter unit may output the operation signal in an activated state when each of the first and second detection signals is determined to be activated.

In some embodiments, the filter unit may output the operation signal in a deactivated state when each of the first and second detection signals is determined to be deactivated.

In some embodiments, when it is determined that one of the first and second detection signals is activated and the other is deactivated, the filter unit may output the operation signal corresponding to a last state in which both the first and second detection signals are activated or deactivated.

In some embodiments, the filter unit may include a first detector configured to output the first detection signal, and a second detector configured to output the second detection signal, wherein the first and second detectors output the first and second detection signals in an activated or a deactivated state, based on first and second reference voltages.

In some embodiments, in a transition section in which the clock synchronizing signal transitions from a first level to a second level, the first detector may output the first detection signal corresponding to the clock synchronizing signal in the second level, based on the first and second reference voltages.

In some embodiments, in a transition section in which the clock synchronizing signal transitions from a first level to a second level, the second detector may continue to output the second detection signal corresponding to the clock synchronizing signal in the second level for a predetermined time after the clock synchronizing signal has transitioned, based on the first and second reference voltages.

In some embodiments, the filter unit may further include a comparator configured to compare the activation states of the first and second detection signals.

In some embodiments, the comparator may be configured to output the operation signal, based on each activation state of the first and second detection signals.

In some embodiments, the internal clock generator may be configured to output a lock signal when the CDR operation is completed.

In some embodiments, the internal clock generator included in one of the source driving chips may output the lock signal to the internal clock generator of the next source driving chip electrically connected to the one source driving chip.

In some embodiments, the internal clock generator included in any one of the source driving chips may be electrically connected to the timing controller.

In some embodiments, the internal clock generator included in any one of the source driving chips may be configured to feed the lock signal back to the timing controller.

In some embodiments, display devices may further include a display panel configured to display images according to a plurality of frames.

In some embodiments, the timing controller may output the clock synchronizing signal in an activated state during a blank section formed between each frame.

BRIEF DESCRIPTION OF THE DRAWINGS

The accompanying drawings are included to provide a further understanding of the present system and method, and are incorporated in and constitute a part of this specification. The drawings illustrate exemplary embodiments of the present system and method and, together with the description, serve to explain principles of the present system and method. In the drawings:

FIG. 6 is a table showing operations according to the first transition section of the filter unit in FIG. 5; and FIG. 7 is a table showing operations according to the second transition section of the filter unit in FIG. 5.

DETAILED DESCRIPTION OF THE EMBODIMENTS

Figure 1:
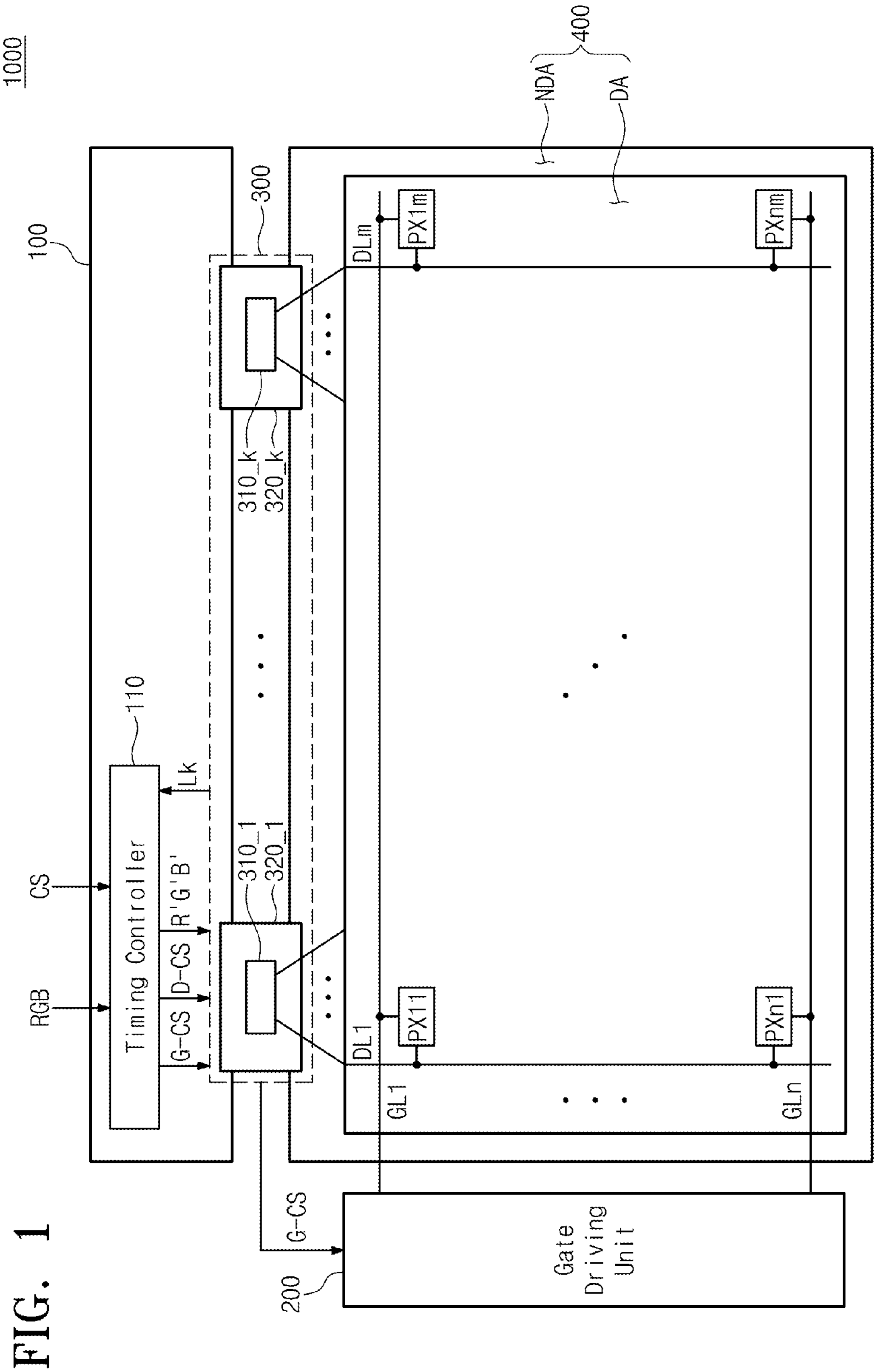
FIG. 1 is a block diagram illustrating a display device according to an embodiment of the present system and method.

Although the present system and method are described in detail with reference to particular embodiments illustrated in the drawings, the present system and method may be variously modified and embodied in various forms. Thus, the particular embodiments disclosed herein are not limiting of the present system and method. Rather, all modifications, equivalents or substitutes of the teachings herein are included in the scope of the present system and method.

In the drawings, like reference numerals or symbols refer to like elements throughout. In the drawings, dimensions of structures are scaled up or down for clarity of illustration. Terms such as "first" or "second" may be used to describe various elements. However, the elements are not limited to these terms. These terms are used only to differentiate one element from another one. For example, a "first element" may be referred to a "second element," and vice versa, without departing from the scope of the present system and method. The terms of a singular form may include plural forms unless indicated to the contrary.

In the specification, terms such as "include", "including", "comprise" "comprising", "have", or "having" are used to specify the existence of a feature, a number, a step, an operation, an element, a component disclosed herein, or combinations thereof, but do not exclude the existence or addibility of one or more other features, numbers, steps, operations, elements, components or combinations thereof.

Hereinafter, the present system and method are described in detail with reference to the accompanying drawings.

FIG. 1 is a block diagram illustrating a display device according to an embodiment of the present system and method.

Referring to FIG. 1, the display device 1000 includes a driving circuit board 100, a gate driving unit 200, a data driving unit 300, and a display panel 400.

The driving circuit board 100 includes a timing controller 110 for controlling the overall operations of the display device 1000. The timing controller 110 receives a plurality of image signals RGB and a plurality of control signals CS from the external of the display device 1000. The timing controller 110 converts the data format of the image signals RGB to meet the specifications of the interface with the data driving unit 300. A plurality of image signals R'G'B' having the converted data format is provided to the data driving unit 300.

The timing controller 110 may output a plurality of driving signals in response to the external control signals CS. For example, the timing controller 110 may generate a data control signal D-CS and a gate control signal G-CS as the plurality of driving signals. The data control signal D-CS may include an output start signal, a clock signal, a clock synchronizing signal, a clock training pattern signal, and the like. The gate control signal G-CS may include a vertical start signal, a vertical clock bar signal, and the like. The timing controller 110 transfers the data control signal D-CS and the gate control signal G-CS to the data driving unit 300 and the gate driving unit 200, respectively. The timing controller 110 may transfer the gate control signal G-CS to the gate driving unit 200 via any one of the source circuit boards 320_1 to 320_*k* of the data driving unit 300.

The gate driving unit 200 generates a plurality of gate signals in response to the gate control signal G-CS provided from the timing controller 110. The gate signals are provided to pixels PX11 to PXnm sequentially and row by row through gate lines GL1 to GLn. As a result, the pixels PX11 to PXnm may be driven row by row.

The data driving unit 300 receives the image signals R'G'B' and the data control signal D-CS from the timing controller 110. The data driving unit 300 generates a plurality of data voltages corresponding to the image signals R'G'B' in response to the data control signal D-CS. The data driving unit 300 provides the plurality of pixels PX11 to PXnm with the data voltages through data lines DL1 to DLm.

The data driving unit 300 includes a plurality of source driving chips 310_1 to 310_*k*. Herein, k is an integer greater than 0 but less than m. The source driving chips 310_1 to 310_*k* are mounted on source circuit boards 320_1 to 320_*k*. The source circuit boards 320_1 to 320_*k* may be connected to the driving circuit board 100 and an upper portion of a non-display region NDA surrounding a display region DA.

Furthermore, the source driving chips 310_1 to 310_*k* are mounted on the source circuit boards 320_1 to 320_*k* as a tape carrier package (TCP). However, the present system and method are not limited thereto. For example, the source driving chips 310_1 to 310_*k* may be mounted on the source circuit boards 320_1 to 320_*k* as a chip on glass (COG) type.

According to an embodiment, each of the source driving chips 310_1 to 310_*k* may include an internal clock generator for the CDR operation. The internal clock generator may generate an internal clock in response to the clock signal and the clock training pattern signal included in the data control signal D-CS. When the phase and frequency of the internal clock are locked, the internal clock generator may output a lock signal LK indicating a stable output state.

In this case, the lock signal LK output from one of the source driving chips 310_1 to 310_*k* may be transferred to the next source driving chip electrically connected to the one source driving chip. Particularly, the last source driving chip 310_*k* of the source driving chips 310_1 to 310_*k* may be electrically connected to the timing controller 110. As a result, the lock signal LK output from the source driving chip 310_*k* may be fed back to the timing controller 110. The timing controller 110 starts to interface with the data driving unit 300 in response to the lock signal LK output from the last source driving chip 310_*k*.

The display panel 400 includes the display region DA displaying images and the non-display region NDA disposed surrounding the display region DA.

The display panel 400 may include the plurality of pixels PX11 to PXnm disposed on the display region DA. Furthermore, the display panel 400 includes the gate lines GL1 to GLn and the data lines DL1 to DLm that are insulated from and intersect with the gate lines GL1 to GLn.

The gate lines GL1 to GLn may be connected to the gate driving unit 200 to receive sequential gate signals. The data lines DL1 to DLm may be connected to the data driving unit 300 to receive data voltages.

The pixels PX11 to PXnm are formed at regions where the gate lines GL1 to GLn and the data lines DL1 to DLm intersect with each other. Therefore, the pixels PX11 to PXnm may be arranged with n rows and m columns. Herein, n and m are integers greater than 0.

The pixels PX11 to PXnm are respectively connected to corresponding gate lines GL1 to GLn and corresponding data lines DL1 to DLm. The pixels PX11 to PXnm receive the data voltages through the data lines DL1 to DLm in response to the gate signals provided from the gate lines GL1 to GLn. As a result, the pixels PX11 to PXnm may display grayscales corresponding to the data voltages.

Figure 2:
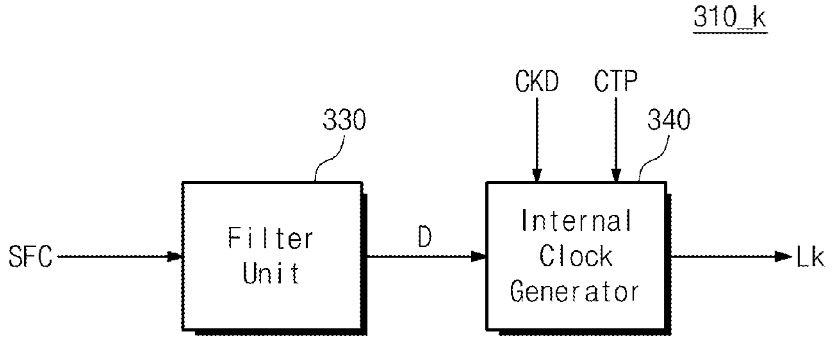
FIG. 2 is a block diagram illustrating a source driving chip in FIG. 1.
Figure 3:
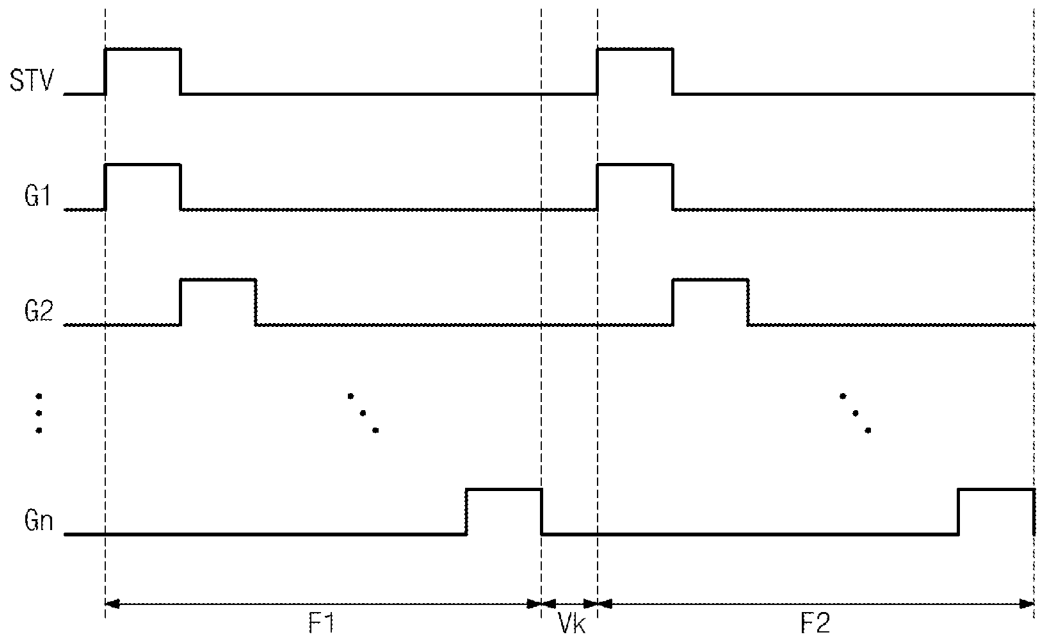
FIG. 3 is a graph showing a blank section between frames.

FIG. 2 is a block diagram illustrating a source driving chip in FIG. 1. FIG. 3 is a graph showing a blank section between frames.

Referring to FIG. 2, the illustrated driving chip may be any one of the source driving chips 310_1 to **310_*k* in FIG. 1. Each of the source driving chips may have the same structure as that described below with reference to FIG. 2**.

Specifically, the source driving chip **310_*k* includes a filter unit 330 and an internal clock generator 340. The filter unit 330 may receive a clock synchronizing signal SFC transferred from the timing controller 110 (see. FIG. 1). The clock synchronizing signal SFC may be included in the data control signal D-CS, and may be a control signal that controls the CDR operation to be performed by the internal clock generator 340**.

The clock synchronizing signal SFC output from the timing controller 110, however, may include noise. Particularly, as an example, a glitch may be generated at the time when the voltage level of the clock synchronizing signal SFC transitions. In this case, as the voltage level of the clock synchronizing signal is affected by the glitch, the CDR operation may not be performed normally by the internal clock generator 340. For example, a clock synchronizing signal in an activated state may be changed to a clock synchronizing signal in a deactivated state due to the glitch caused by external noise. As a result, the CDR operation is not performed by the internal clock generator, which keeps the display device from outputting images in a normal state. Herein, the clock synchronizing signal SFC in the activated state is a control signal that causes the CDR operation to be performed, and the clock synchronizing signal SFC in the deactivated state is a control signal that does not cause the CDR operation to be performed.

According to an embodiment, the filter unit 330 may output an operation signal D, in response to the received clock synchronizing signal SFC, in which the effects of a glitch are filtered out. That is, the operation signal D may reflect the glitch-free state of the clock synchronizing signal SFC. For example, even if a glitch is generated in the clock synchronizing signal SFC at the time when the clock synchronizing signal SFC transitions from the deactivated state to the activated state, the filter unit 330 may output a normal operation signal D that reflects the activated state absent the glitch. The filter unit 330 is described below with reference to FIG. 4.

Furthermore, according to an embodiment, the clock synchronizing signal SFC may be activated in a blank section between each frame displaying an image. Each frame may be defined as a unit of time in which one image is provided. That is, the timing controller 110 may output the clock synchronizing signal SFC in the activated state to each source driving chip **310_*k*** during the blank section between each frame.

Referring to FIG. 3, the blank section formed between each frame is described. The gate driving unit 200 (see FIG. 1) may sequentially output a plurality of gate signals G1 to Gn during each frame in response to a vertical start signal STV. As shown in FIG. 3, gate signals G1~Gn corresponding to a first frame F1 are output, and then gate signals G1~Gn corresponding to a second frame F2 may be output after a predetermined time. Herein, the blank section Vk may be defined as the predetermined time interval until the second frame F2 is activated after the first frame F1 has been completed.

Referring to FIG. 2 again, the internal clock generator 340 receives the operation signal D output from the filter unit 330 and receives the clock signal CKD and the clock training pattern signal CTP from the timing controller 110.

The internal clock generator 340 performs a clock training operation according to the clock training pattern signal CTP, based on the activation state of the operation signal D. Specifically, the internal clock generator 340 may generate an internal clock, as the clock signal CKD and the clock training pattern signal CTP are received. When the phase and frequency of the internal clock are locked through the clock training operation, the internal clock generator 340 may output a lock signal LK indicating whether output is stable or not. That is, as the phase and frequency of the internal clock are stably locked, the internal clock generator 340 may establish a data link with the timing controller 110.

According to an embodiment, when the clock training operation in the internal clock generator included in one source driving chip is completed, the internal clock generator outputs the lock signal LK in the activated state to the internal clock generator in the next source driving chip electrically connected to the one source driving chip.

According to an embodiment, when the clock training operation in the internal clock generator included in the last source driving chip is completed, the internal clock generator feeds the lock signal LK in the activated state to the timing controller 110.

Subsequently, in response to receiving the lock signal LK in the activated state from the last source driving chip, the timing controller 110 starts to transfer image signals R'G'B' to each source driving chip.

Figure 4:
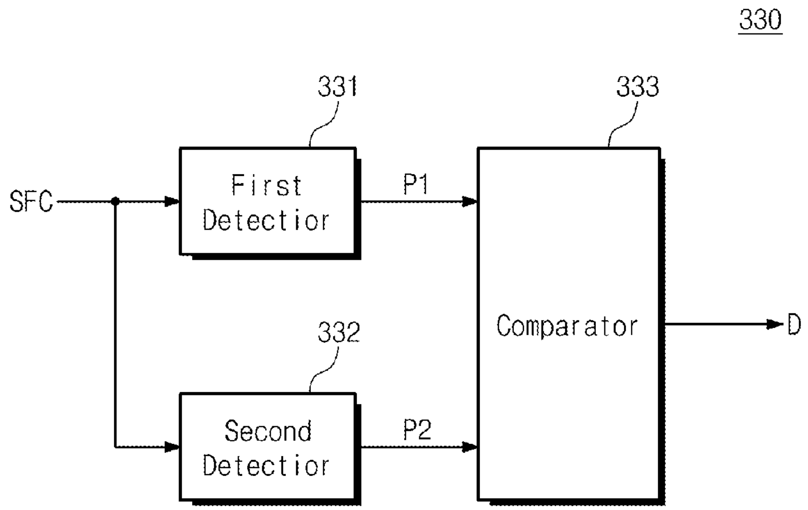
FIG. 4 is a block diagram illustrating the filter unit in FIG. 2.

FIG. 4 is a block diagram illustrating the filter unit in FIG. 2.

Referring to FIG. 4, the filter unit 330 includes first and second detectors 331 and 332 and a comparator 333.

The first and second detectors 331 and 332 respectively receive the clock synchronizing signal SFC output from the timing controller 110 (see FIG. 1). The first detector 331 outputs a first detection signal P1 in response to the clock synchronizing signal SFC. The second detector 332 outputs a second detection signal P2 in response to the clock synchronizing signal SFC. The first and second detection signals P1 and P2 together may be used to determine whether the CDR operation is to be performed by the internal clock generator 340. For example, when the first and second detection signals P1 and P2 are activated, the internal clock generator 340 performs the CDR operation. On the other hand, when the first and second detection signals P1 and P2 are deactivated, the internal clock generator 340 does not perform the CDR operation.

Specifically, the first detector 331 may output the first detection signal P1 in the activated or deactivated state, based on first and second reference voltages Vs1 and Vs2

Figure 5:
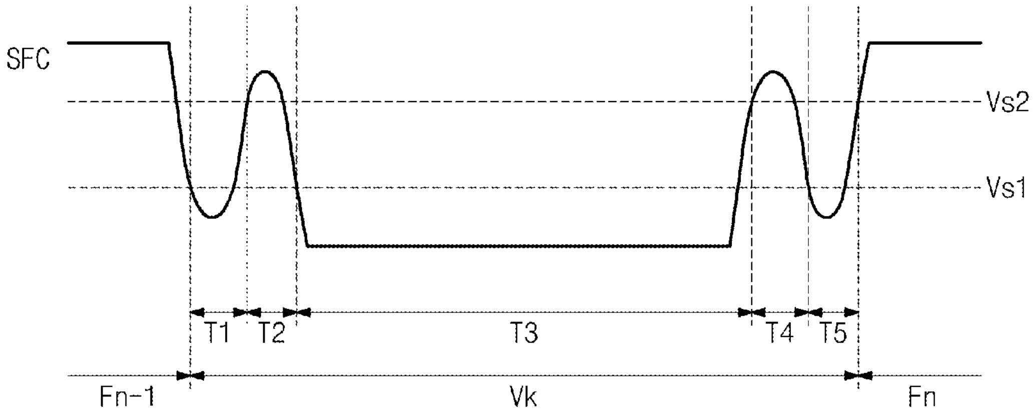
FIG. 5 is a graph showing a clock synchronizing signal provided to the filter unit in FIG. 4.

(see FIG. 5). For example, the first detector 331 may output the first detection signal P1 in the activated state if the level of the clock synchronizing signal SFC is lower than the first reference voltage Vs1. Conversely, the first detector 331 may output the first detection signal P1 in the deactivated state if the level of the clock synchronizing signal SFC is higher than the second reference voltage Vs2.

The second detector 332 may output the second detection signal P2 in the activated or deactivated state, based on the first and second reference voltages Vs1 and Vs2. Like the first detector 331, the second detector 332 may output the second detection signal P2 in the activated state if the level of the clock synchronizing signal SFC is lower than the first reference voltage Vs1. Conversely, the second detector 332 may output the second detection signal P2 in the deactivated state if the level of the clock synchronizing signal SFC is higher than the second reference voltage Vs2.

Particularly, according to an embodiment, the second detector 332 may output the second detection signal P2 in the same state, i.e., in the activated or deactivated state, for a predetermined time.

For example, after the clock synchronizing signal SFC has transitioned to a level lower than the first reference voltage Vs1, the second detector 332 outputs the second detection signal P2 in the activated state. Subsequently, the second detector 332 continues to output the second detection signal P2 in the activated state for a predetermined time. That is, the second detector 332 may continue to output the second detection signal P2 for a predetermined time after the level of the clock synchronizing signal SFC has transitioned. After the predetermined time elapses, the second detector 332 may output the second detection signal P2 according to the level of the clock synchronizing signal SFC again.

Conversely, after the clock synchronizing signal SFC has transitioned to a level higher than the second reference voltage Vs2, the second detector 332 outputs the second detection signal P2 in the deactivated state. Subsequently, the second detector 332 may continue to output the second detection signal P2 in the deactivated state for a predetermined time.

The comparator 333 receives the first and second detection signals P1 and P2 from the first and second detectors 331 and 332, respectively. The comparator 333 compares the activation state of the first and second detection signals P1 and P2, and outputs the operation signal D according to the comparative result.

According to an embodiment, the comparator 333 outputs the operation signal D in the activated state when both the first and second detection signals P1 and P2 are determined to be activated. As a result, the internal clock generator 340 may perform the clock training operation in response to the operation signal D in the activated state.

According to an embodiment, the comparator 333 outputs the operation signal D in the deactivated state when both the first and second detection signals P1 and P2 are determined to be deactivated. As a result, the internal clock generator 340 does not perform the clock training operation in response to the operation signal D in the deactivated state.

According to an embodiment, the comparator 333 determines that a glitch has been generated in the clock synchronizing signal SFC when it determines that one of the first and second detection signals P1 and P2 is activated and the other is deactivated. In this case, the comparator 333 continues to output the latest operation signal D corresponding to when both the first and second detection signals P1 and P2 were activated or deactivated.

In general, due to external characteristics, a glitch may be generated at the time when the clock synchronizing signal SFC transitions. As a result, the activation state of the first detection signal P1 output from the first detector 331 may be changed at the time when the clock synchronizing signal SFC transitions.

However, as described above, the second detector 332 according to the present system and method continues to output the second detection signal P2 in the same state for a predetermined time after the clock synchronizing signal SFC has transitioned. Therefore, when one of the first and second detection signals P1 and P2 is activated and the other is deactivated, the comparator 333 continues to output the latest operation signal D corresponding to when both the first and second detection signals P1 and P2 were activated or deactivated.

FIG. 5 is a graph showing a clock synchronizing signal provided to the filter unit in FIG. 4. FIG. 6 is a table showing operations according to the first transition section of the filter unit in FIG. 5. FIG. 7 is a table showing operations according to the second transition section of the filter unit in FIG. 5.

FIGS. 4 to 7 illustrate operations in which the clock synchronizing signal SFC output from the timing controller 110 (see FIG. 1) is provided to the filter unit 330. Particularly, as shown in FIG. 5, the clock synchronizing signal SFC may be activated in a blank section Vk formed between a first frame Fn−1 and a second frame Fn subsequent to the first frame Fn−1. That is, the clock synchronizing signal SFC maintains its deactivated state during the first and second frames Fn−1 and Fn during which images are displayed and maintains its activated state during the blank section Vk. Hereinafter, the activated state and the deactivated state correspond to a low level LOW and high level HIGH, respectively.

Also, first and second sections T1 and T2 are referred to as the first transition section, and fourth and fifth sections T4 and T5 are referred as the second transition section. The first transition section may be a section in which the clock synchronizing signal SFC transitions from the deactivated state to the activated state. The second transition section may be a section in which the clock synchronizing signal SFC transitions from the activated state to the deactivated state.

Specifically, referring to FIGS. 5 and 6, in the first section T1, the timing controller 110 (see FIG. 1) controls the clock synchronizing signal SFC to transition from a high level HIGH to a low level LOW. That is, the timing controller 110 outputs the clock synchronizing signal SFC for the clock training operation to be performed in each source driving chip.

In this case, as the voltage level of the clock synchronizing signal SFC becomes lower than the first reference voltage Vs1, the first detector 331 outputs the first detection signal P1 at a low level LOW. Likewise, the second detector 332 outputs the second detection signal P2 at a low level LOW. As the first and second detection signals P1 and P2 have the same low level LOW, the comparator 333 outputs the operation signal D according to a low level LOW. As a result, the internal clock generator 340 performs the clock training operation in response to the operation signal D at a low level LOW.

In the second section T2, a glitch according to external characteristics is generated in the clock synchronizing signal SFC. Hereinafter, when the voltage level of the clock synchronizing signal SFC is changed according to the glitch as shown in the second section T2, the wave form achieved by this change is referred to as a glitch wave form. In this case, the glitch generated in the clock synchronizing signal SFC causes the clock synchronizing signal SFC to transition from a low level LOW to a high level HIGH. As a result, as the voltage level of the clock synchronizing signal SFC becomes higher than the second reference voltage Vs2, the first detector 331 outputs the first detection signal P1 at a high level HIGH.

However, the second detector 332 according to the present system and method continues to output the same voltage level for a predetermined time after the clock synchronizing signal SFC has transitioned. As a result, the second detector 332 does not output the second detection signal P2 at a high level HIGH during the second section T2, but continues to output the second detection signal P2 at a low level LOW, even though the glitch generated in the clock synchronizing signal SFC caused the clock synchronizing signal SFC to transition from a low level LOW to a high level HIGH.

Herein, the predetermined time may be set to be longer than the time required for the level of the clock synchronizing signal SFC to completely transition from the deactivated state to the activated state. Herein, it may be illustrated that the glitch generated in the clock synchronizing signal SFC is generated prior to a minimum time required for the level of the clock synchronizing signal SFC to completely transition from the deactivated state to the activated state. That is, the predetermined time may be set to be longer than an initial transition time of the clock synchronizing signal SFC in which the glitch is generated.

In this case, as the levels of the first and second detection signals P1 and P2 are different from each other, the comparator 333 outputs the latest operation signal D corresponding to when both the first and second detection signals P1 and P2 were activated or deactivated. Therefore, the comparator 333 may output the operation signal D at a low level LOW. As a result, the internal clock generator 340 may continue to perform the clock training operation in response to the operation signal D output at a low level LOW.

In a third section T3, as the clock synchronizing signal SFC maintains the low level LOW state, the comparator 333 continues to output the operation signal D at a low level LOW. Therefore, the internal clock generator 340 continues to perform the clock training operation in response to the operation signal D output at a low level LOW.

Referring to FIGS. 5 and 7, in the fourth section T4, as the clock training operation is completed by the internal clock generator 340, the timing controller 110 controls the clock synchronizing signal SFC to transition from a low level LOW to a high level HIGH.

In this case, as the voltage level of the clock synchronizing signal SFC becomes higher than the second reference voltage Vs2, the first detector 331 outputs the first detection signal P1 at a high level HIGH. Likewise, the second detector 332 outputs the second detection signal P2 at a high level HIGH. As the first and second detection signals P1 and P2 have the same high level HIGH, the comparator 333 outputs the operation signal D at a high level HIGH. As a result, the internal clock generator 340 does not perform the clock training operation in response to the operation signal D output at a high level HIGH.

In the fifth section T5, a glitch according to external characteristics is generated in the clock synchronizing signal SFC. In this case, the glitch generated in the clock synchronizing signal SFC causes the clock synchronizing signal SFC to transition from a high level HIGH to a low level LOW. As a result, as the voltage level of the clock synchronizing signal SFC becomes lower than the first reference voltage Vs1, the first detector 331 may output the first detection signal P1 at a low level LOW.

However, the second detector 332 according to the present system and method continues to output the same voltage level for a predetermined time after the clock synchronizing signal SFC has transitioned. As a result, the second detector 332 does not output the second detection signal P2 at a low level LOW, but continues to output the second detection signal P2 at a high level HIGH, even though the glitch generated in the clock synchronizing signal SFC caused the clock synchronizing signal SFC to transition from a high level HIGH to a low level LOW.

In this case, as the levels of the first and second detection signals P1 and P2 are different from each other, the comparator 333 outputs the latest operation signal D corresponding to when both the first and second detection signals P1 and P2 were activated or deactivated. Therefore, the comparator 333 may output the operation signal D at a high level HIGH. As a result, the internal clock generator 340 does not perform the clock training operation in response to the operation signal D output at a high level HIGH.

In a subsequent section, the timing controller 110 controls the clock synchronizing signal SFC to be maintained at a high level HIGH from a low level LOW during the second frame Fn at which an image is displayed. That is, the timing controller 110 may output image signals and driving signals while the clock synchronizing signal SFC is maintained at a high level HIGH.

As described above, each source driving chip according to the present system and method performs the clock training operation in response to the clock synchronizing signal SFC output from the timing controller 110. In this case, through the filter unit included in each source driving chip, the clock synchronizing signal SFC may be controlled so that its level does not transition due to a glitch. As a result, each source driving chip may normally perform the clock training operation in response to the activation state of the clock synchronizing signal SFC.

According to embodiments of the present system and method, the general reliability of driving in a display device may be improved.

While specific terms are used to describe the above embodiment, they are not used to limit the meaning or the scope of the present system and method described in the Claims, but merely used to explain the present system and method. Accordingly, a person having ordinary skill in the art would understand from the above that various modifications and other equivalent embodiments are also possible. Hence, the scope of the present system and method are determined by the technical scope of the accompanying Claims.

What is claimed is:

1. A display device, comprising:

a timing controller configured to output a clock synchronizing signal for a clock data recovery operation;

a plurality of source driving chips configured to receive the clock synchronizing signal; and a display panel connected to the source driving chips and configured to output display images according to a plurality of frames, wherein each of the source driving chips comprises:

a filter unit configured to determine whether first and second detection signals are activated or deactivated in response to a voltage level of the clock synchronizing signal, and to output an operation signal according to a comparative result of the first and second detection signals; and an internal clock generator configured to perform the clock data recovery operation in response to the activation state of the operation signal, and wherein the filter unit outputs the operation signal corresponding to a last state in which both the first and second detection signals are activated or deactivated, when it is determined that one of the first and second detection signals is activated and the other is deactivated.

2. The display device of claim 1, wherein the filter unit outputs the operation signal in an activated state when each of the first and second detection signals is determined to be activated.

3. The display device of claim 1, wherein the filter unit outputs the operation signal in a deactivated state when each of the first and second detection signals is determined to be deactivated.

4. The display device of claim 1, wherein the filter unit comprises:

a first detector configured to output the first detection signal; and a second detector configured to output the second detection signal, wherein the first and second detectors output the first and second detection signals in an activated or a deactivated state, based on first and second reference voltages.

5. The display device of claim 4, wherein, in a transition section in which the clock synchronizing signal transitions from a first level to a second level, the first detector outputs the first detection signal corresponding to the clock synchronizing signal in the second level, based on the first and second reference voltages.

6. The display device of claim 4, wherein, in a transition section in which the clock synchronizing signal transitions from a first level to a second level, the second detector continues to output the second detection signal corresponding to the clock synchronizing signal in the second level for a predetermined time after the clock synchronizing signal has transitioned, based on the first and second reference voltages.

7. The display device of claim 4, wherein the filter unit further comprises a comparator configured to compare the activation states of the first and second detection signals.

8. The display device of claim 7, wherein the comparator is further configured to output the operation signal, based on each activation state of the first and second detection signals.

9. The display device of claim 1, wherein the internal clock generator is configured to output a lock signal when the clock data recovery operation is completed.

10. The display device of claim 9, wherein the internal clock generator included in one of the source driving chips outputs the lock signal to the internal clock generator of the next source driving chip electrically connected to the one source driving chip.

11. The display device of claim 9, wherein the internal clock generator included in any one of the source driving chips is electrically connected to the timing controller.

12. The display device of claim 11, wherein the internal clock generator included in any one of the source driving chips is configured to feed the lock signal back to the timing controller.

13. The display device of claim 1, wherein the timing controller outputs the clock synchronizing signal in an activated state during a blank section formed between each frame.

* * * * *